Patented June 1, 1926.

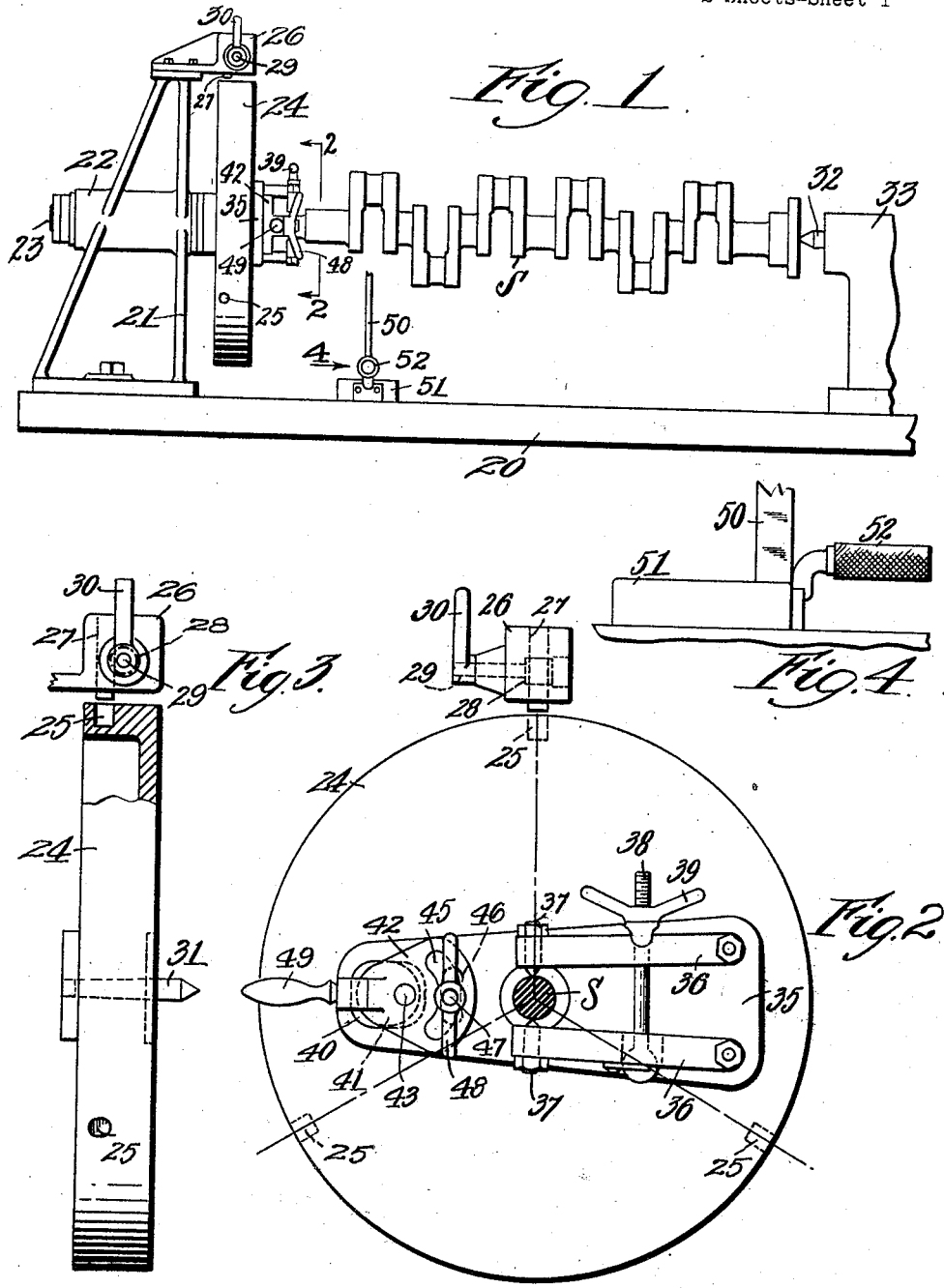

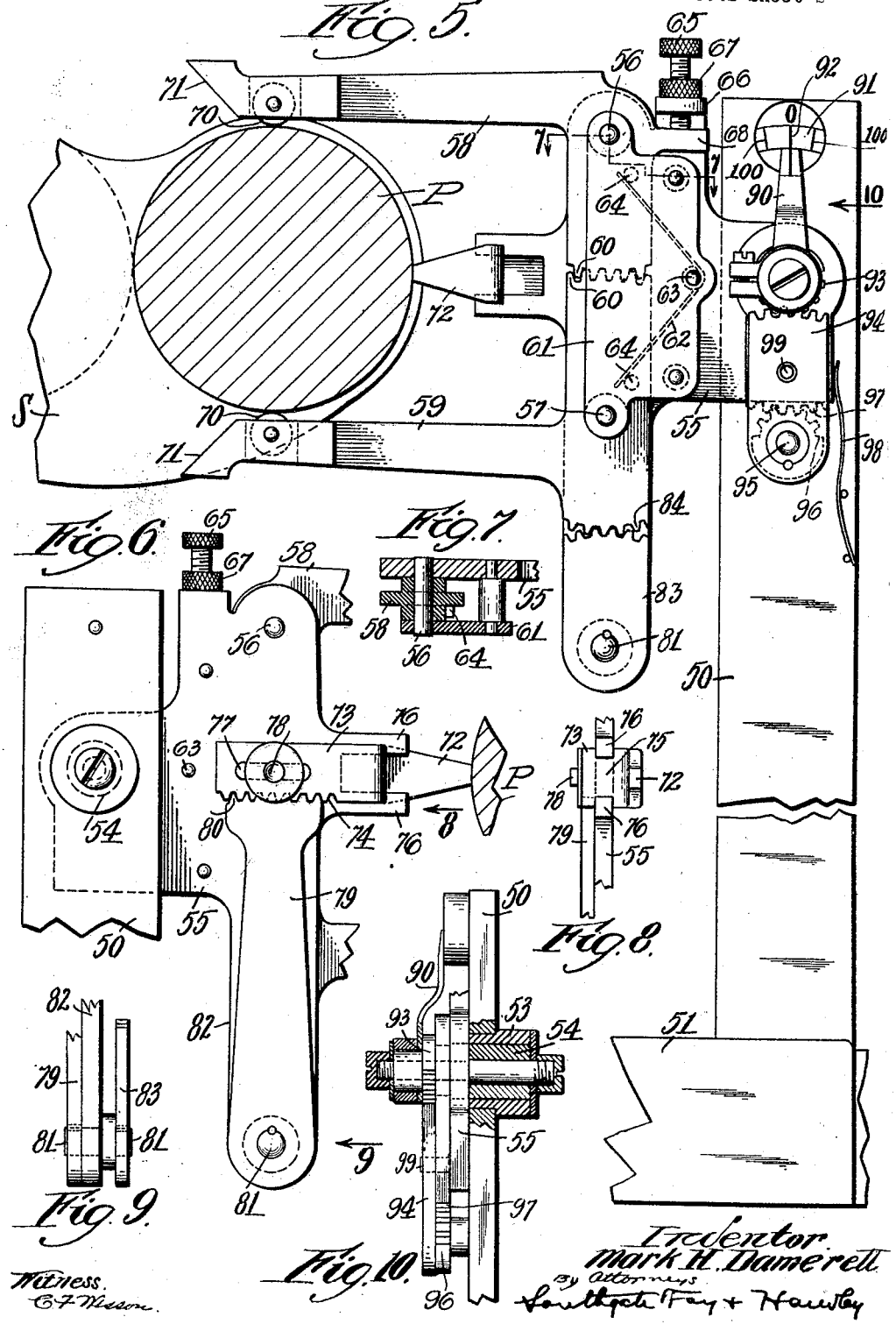

1,587,217

UNITED STATES PATENT OFFICE.

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS.

CRANK-SHAFT INDEXING MACHINE.

Application filed November 12, 1924. Serial No. 749,549.

This invention relates to a machine for testing crankshafts to determine the accuracy of the angular positions of the different crankpins. In the manufacture of such crank shafts, particularly if they are of the six-throw type, it is customary to forge the shaft with all of the cranks in the same plane and to then twist the cranks to their correct angular positions.

It is the object of my invention to provide an improved and simplified machine by which a crankshaft thus produced may be easily and accurately tested and by which any error in the angular spacing of the crankpins will be quickly indicated.

My invention further relates to arrangements and combinations of parts which will be hereinafter described and more particularly pointed out in the appended claims.

A preferred form of the invention is shown in the drawings in which

Fig. 1 is a front elevation of my improved indexing machine;

Fig. 2 is a sectional end elevation, taken along the line 2—2 in Fig. 1;

Fig. 3 is a side elevation, partly in section, of the index plate or head;

Fig. 4 is a detail side elevation of the base of the indicating device, looking in the direction of the arrow 4 in Fig. 1;

Fig. 5 is a side elevation of the indexing device;

Fig. 6 is a partial side elevation, looking in the opposite direction from Fig. 5;

Fig. 7 is a detail sectional plan view, taken along the line 7—7 in Fig. 5;

Figs. 8 and 9 are detail rear elevations, looking in the direction of the arrows 8 and 9 in Fig. 6; and Fig. 10 is a partial front elevation, partly in section, and looking in the direction of the arrow 10 in Fig. 5.

Referring to Fig. 1, my improved indexing machine comprises a bed or base 20 having a flat and accurately finished upper surface to which a head frame 21 is securely bolted. This head frame provides a bearing 22 for a shaft or spindle 23 which supports an index disc or plate 24. This plate is provided with holes 25 in its periphery accurately spaced to correspond to the angular spacing of crankpins in the crankshaft to be tested.

A bracket 26 projects from the frame 21 and is provided with a plunger 27 having rack teeth on one side thereof engaged by a pinion 28 on a short shaft 29 which in turn is provided with a handle 30. By turning the shaft and pinion, the rack plunger may be moved downward into one of the holes 25, thus locking the disc 24 in a definite angular position. The disc 24 is provided with a live center 31 (Fig. 3); and a dead center 32 (Fig. 1) is provided in a suitable tail stock 33 adjustably secured to the bed 20.

I have provided an improved clamping device or dog by which a crankshaft mounted on the centers 31 and 32 may be secured to the index disc 24 and may have limited angular adjustment relative thereto. The clamping device comprises a plate 35 (Fig. 2) on which are pivoted two levers 36 having sharp pointed studs or spurs 37 positioned to engage opposite sides of an end portion of a crankshaft S. A bolt 38 has a pivotal bearing in one lever 36 and is provided with a wing nut 39 by which the levers 36 and studs 37 may be forced against the crankshaft S.

A recess 40 is provided near one end of the plate 35, this recess having straight parallel sides spaced apart to receive an eccentric or cam 41 fixed on the inner side of an adjusting plate 42. The plate 42 is pivoted at 43 to the index disc 24 and is provided with a segmental slot 45. The plate 35 is also provided with a short segmental slot 46 and a stud 47 extends through the two slots 45 and 46 and is secured in the disc 24. A wing nut or handle 48 is threaded on the stud 47 to clamp the parts together.

The adjusting plate 42 is provided with a handle 49 by which it may be turned angularly about the stud 43 and such angular movement turns the eccentric or cam 41 in the recess 40, thus moving the plate 35 about the crankshaft centers 31—32. In this manner the crankshaft may be brought accurately to a desired angular position relative to the holes 25 in the head 24.

I will now describe the indicating device by which the accuracy of the angular spacing of the different crankpins is determined. This device comprises a post or standard 50 (Figs. 4 and 5) fixed to a heavy block or base 51 which is provided with an accurately finished lower surface and which may be moved about on the bed 20 by means of a handle 52 (Fig. 4). At its upper end the post 50 is provided with a sleeve or bearing 53 (Fig. 10) for a hollow stud 54. The stud 54 supports a plate 55 which is provided with pivot studs 56 and 57 (Fig. 5) for upper and lower index arms 58 and 59.

These arms 58 and 59 are provided with segmental gear teeth 60 which mesh accurately so that the two arms must move inward or outward simultaneously to the same extent. A cover plate 61 is mounted on the studs 56 and 57 to retain the index arms 58 and 59 and also retain a flat bent spring 62 which engages a stud 63 fixed in the plate 55 and which also engages studs 64 in the arms 58 and 59. The spring 62 thus acts to force the index arms 58 and 59 yieldingly toward each other.

This yielding inward movement is limited by an adjusting screw 65 threaded in an offset projection 66 of the plate 55 and provided with a lock nut 67. The screw engages a lug 68 projecting from the bearing portion of the index arm 58.

The arms 58 and 59 are provided with rolls 70 to engage the work and with bevelled outer faces 71 by which the arms are pushed apart as the device is presented to the work.

A third index member 72 is carried by a slide 73 (Fig. 6) having a series of rack teeth 74 on its lower edge. An offset portion 75 (Fig. 8) of the slide 73 is slidable between guide-ways or projections 76 on the plate 55 and the offset 75 (Fig. 6) of the slide 73 is provided with a slot 77 on a pin or stud 78 in the plate 55.

A lever or arm 79 is provided with segment teeth 80 meshing with the rack teeth 74. The arm 79 is mounted on a stud or short shaft 81 having a bearing in a downwardly projecting portion 82 of the plate 55. A segment gear plate 83, (Figs. 5 and 9) is fixed to the opposite end of the shaft 81 and engages segment gear teeth 84 (Fig. 5) formed on a downward projection of the index lever 59.

The slide 72 is thus connected for inward and outward movement equally and simultaneously with the movement of the index levers 58 and 59, and the index point 72 has a radial movement corresponding to the radial movement of the rolls 70 mounted on the index levers 58 and 59. As the indexing device is presented to a crankpin P (Fig. 5) of the crankshaft S, these three contact points engage the crankpin and the plate 55 swings about its stud 54 as the index arms center themselves upon the crankpin.

In order that the adjusted position of the plate 55 may be easily read, I have provided an index arm 90 (Figs. 5 and 10) pivoted upon the axis of the stud 54 and co-operating with a scale 91 having a zero line 92 thereon. The arm 90 is clamped to the hub of a pinion 93 engaged by a segment gear plate 94 pivoted at 95 on the post 50 and having a second segment gear 96 fixed thereto. The segment gear 96 is engaged by segment gear teeth 97 on a lower edge of the plate 55.

Any angular movement of the plate 55 will thus be largely magnified and indicated by the index arm 90 with reference to the zero line 92. A flat spring 98 (Fig. 5) on the post 50 engages an end surface of the plate 55 and partially supports the weight of the index arms. A stud 99 is fixed in the plate 55 and extends through an opening in the segment gear plate 94 and thus limits swinging movement of the plate 55.

Having described the details of construction of my improved indexing machine, the utility and method of operation thereof will be readily apparent. A crankshaft S is first provided with center holes at the ends and is then mounted upon the centers 31 and 32 and is moved angularly to such a position that one of the crankpins P is approximately on the horizontal diameter when the plunger 27 is in one of the holes 25. The nut 39 is then tightened on the bolt 38 to press the spurs 37 firmly against the end portion of the crankshaft. The handle 49 on the eccentric plate 42 may then be moved to adjust the clamp relatively to the disc 24 and move the selected crankpin into exact position as indicated by the index arm 90 (Fig. 5).

The indicating device is then withdrawn, the plunger 27 is raised and the disc 24 and crankshaft are rotated to the next hole 25 when the indicating device is again used to show the relative position of the second crankpin. If the cranks are exactly spaced, the index arm will again register zero, but if the spacing is inaccurate, the degree of inaccuracy will be indicated at one side or the other of the zero line 92. Allowable limits of inaccuracy may be indicated by additional lines 100 at each side of the zero line 92. Proceeding in this way, successive crankpins are indicated and if all of the crankpins are found to be within the allowable limits of accuracy, the shaft is passed for further operations.

Having thus described my invention and the advantages thereof I do not wish to be limited to the details herein disclosed otherwise than as set forth in the claims, but what I claim is:—

1. A crank shaft indexing machine comprising a flat finished bed, means to support and rotate a crank shaft having a plurality of crank pins about an axis parallel to said crank shaft and to hold said shaft in different positions, and an indicating device having a base slidable on said bed and movable to cause said device to co-operate with any selected crank pin, said device having indicating means thereon to indicate the height of the center of each crank pin above the bed.

2. A crank shaft indexing machine comprising a flat finished bed, means to support and rotate a crank shaft having a plurality of crank pins about an axis parallel to said bed, means to determine different selected angular positions for said crank shaft and to hold said shaft in such positions, and indicating means to accurately indicate variations in height of different crank pins above the bed when thus successively positioned.

3. In an indicating device, a pair of pivoted angularly movable arms having contact elements thereon, an indicating point having straight line movement along the center line between said arms, and connections effective to cause said arms and said point to have substantially equal and simultaneous movements toward and from a common center.

4. An indicating device for an indexing machine comprising a base, a standard thereon, a pair of indicating arms mounted on said standard, connections effective to cause said arms to move simultaneously toward and from each other, a contacting point and means for moving said contacting point along the center line between said arms, said arms and point being also supported for angular movement as a unit, and means to indicate the angular displacement of said unit from a predetermined position.

5. An indicating device for an indexing machine comprising a base, a standard thereon, a pair of indicating arms mounted on said standard, connections effective to cause said arms to move simultaneously toward and from each other, said arms being also supported for angular movement as a unit, and means to indicate the angular displacement of said unit from a predetermined position, said latter means including multiplying devices for magnifying the indication of angular displacement.

6. An indicating device for an indexing machine comprising a base, a standard thereon, a plate pivoted on said standard, a pair of contacting arms pivoted to said plate, gear connections between said arms, a sliding indicating point, a gear connection between said arms and said point, an indicating finger, and multiplying gear connections between said plate and said finger, whereby said arms and said point move simultaneously and equally toward and from a common center, and said finger indicates on an enlarged scale the angular displacement of said plate.

7. In a crank shaft indexing machine, an index disc, a clamp adapted to be secured to a crank shaft, means to secure said clamp to said disc, and means to angularly adjust said clamp relative to said disc.

8. A device as set forth in claim 12, in which said adjusting means comprises a cam plate pivoted on said disc, said clamp having an opening to receive said cam plate, and means to swing said cam plate on its pivot.

9. An indexing machine, comprising a bed having a flat finished upper surface, means to rotatably support a crank shaft having a plurality of crank pins with its axis parallel to said surface, means to adjust and hold said crank shaft in different predetermined angular positions, and means to indicate deviations in crank pin position from said selected angular positions.

In testimony whereof I have hereunto affixed my signature.

MARK H. DAMERELL.